March 3, 1970     W. LEDRAY ET AL     3,498,673

MACHINE GUIDANCE SYSTEM AND METHOD

Filed Feb. 19, 1968

INVENTORS
WILLIAM LEDRAY
WILLIAM D. COSKI

*Robert R. Paquin*

ATTORNEY

United States Patent Office 3,498,673
Patented Mar. 3, 1970

3,498,673
MACHINE GUIDANCE SYSTEM AND METHOD
William Ledray, Seattle, and William D. Coski, Mercer Island, Wash., assignors to Lawrence Manufacturing Company, Seattle, Wash., a corporation of Delaware
Filed Feb. 19, 1968, Ser. No. 706,284
Int. Cl. E21c 35/00
U.S. Cl. 299—1
9 Claims

ABSTRACT OF THE DISCLOSURE

A tunnel boring machine disposed within a tunnel and provided with a guidance system comprising a laser projection unit fixedly supported by a wall of the tunnel and directing its beam onto a mirror-like reflector mounted on the machine, whereby the reflector provides a reflection of the beam on a target also mounted on the machine. The tunnel boring apparatus is steered to maintain the reflection at a predetermined location on the target.

Background of the invention

The present invention relates to the guidance of apparatus such as tunnel boring machines and more particularly to the guidance of such apparatus along a predetermined path by a light beam, for example the laser beam emitted by a laser projection unit.

Conventionally, numerous types of systems and methods have been developed for guiding an apparatus, such as a tunnel boring machine, along a predetermined path. For example, United States Patent No. 3,321,248, issued on May 23, 1967, to Thomas N. Williamson et al. discloses the employment of a laser beam for this purpose. Most of these prior systems and methods are, however, objectionable in that they either do not provide a continuous reading of the direction of movement of the machine, and/or fail to correct for error introduced by roll of the machine, and/or require that the operator of the machine make readings on a plurality of instruments thereby adding undesirably to the complexity of the operation of the machine.

Summary of the invention

An object of the present invention is to provide a new and improved guidance system which is particularly constructed and arranged to provide accurate guidance for a machine such as a tunnel boring machine.

Another object of the invention is to provide a new and improved guidance system which is particularly constructed and arranged to overcome the aforementioned objections to prior guidance systems.

These objects, and those other objects and advantages of the invention which will be apparent from the following description taken in connection with the accompanying drawings, are attained by the provision of a guidance system for a tunnel boring machine, which may comprise reflecting means mounted on the machine, signal emitting means mounted on a fixed support and arranged to direct a beam of light onto the reflecting means whereby the reflecting means provides a reflection of said light beam, target means, and mounting means mounting the target means on the machine spaced from the reflecting means, the target means being out of the direct path of said light beam and arranged to receive said reflection of said light beam from the reflecting means, and the mounting means being connected to the machine by a connection at a radius from the machine centerline equal to the radius of the reflection on the target means from the centerline of the light beam.

Description of the preferred embodiment

Figure 1:
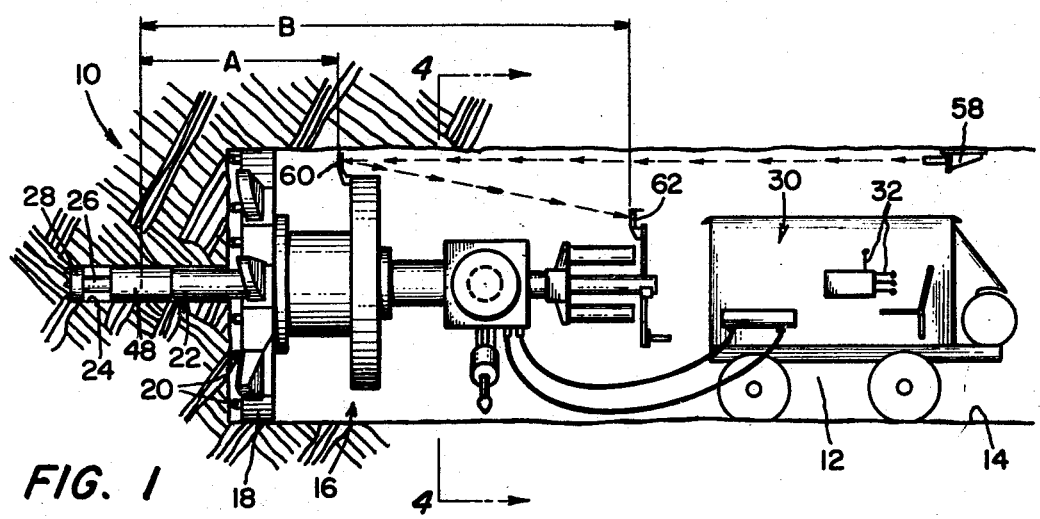
FIG. 1 is a schematic illustration of a guidance system constructed in accordance with the present invention as applied on a tunnel boring machine in a tunnel.
Figure 2:
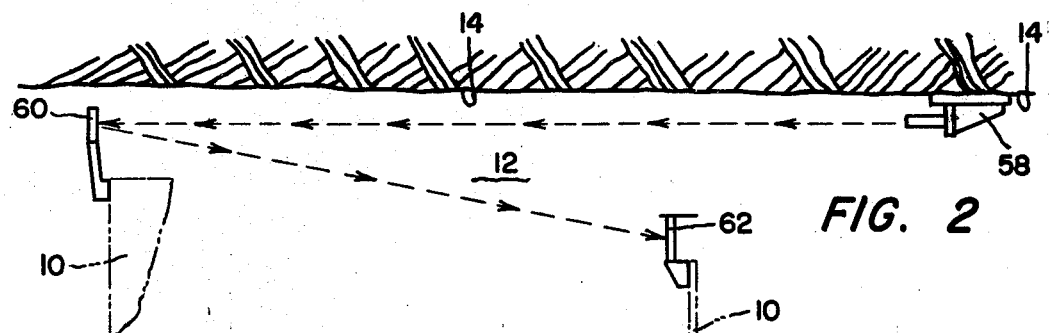
FIG. 2 is an enlarged schematic view of the guidance system, per se.

Referring more particularly to the drawings wherein similar reference characters designate corresponding parts throughout the several views, FIG. 1 schematically illustrates an embodiment of the guidance system employed on a tunnel boring machine designated generally as 10 which is in the process of forming a tunnel 12 having walls 14. The tunnel boring machine 10, per se, is of the type disclosed in United States patent application Ser. No. 681,035, filed Nov. 6, 1967, by James C. Lawrence, now Patent No. 3,437,380, issued Apr. 8, 1969, and, hence, will not be herein described in detail.

The tunnel boring machine 10, generally considered, comprises a supporting structure or frame designated generally as 16 which mounts a main cutter formed by a relatively large, rotatable, annular plate assembly 18 having a plurality of spaced cutter bits 20 (for example, roller bits) on its forward or front face. A non-rotatable pilot tube assembly 22 projects forwardly from the center of the main cutter into a pilot bore 24 formed in advance of the tunnel or main bore 12. A pilot cutter assembly, comprising a rotatable shaft 26 axially extending through the tube assembly 22 and a pilot bit 28 carried by the shaft 26, is mounted for axial slidable movement relative to the tube assembly 22. The main cutter and the pilot cutter assembly are driven by separate electrically operated, hydraulic pumps (not shown); and the tunnel boring machine 10 is powered by a mobile power unit 30 as controlled by operating levers 32.

Figure 4:
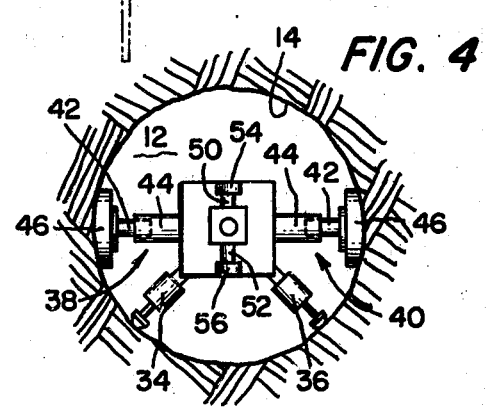
FIG. 4 is a sectional view taken on line 4—4 of FIG. 1, looking in the direction of the arrows.

The tunnel boring machine 10 is steered by a steering structure of the type disclosed in the aforementioned United States patent application Ser. No. 681,035. More specifically, as described in said application, the rearward end of the pilot tube assembly 22 is supported for vertical movement relative to the frame 16 as dictated by pressurized fluid selectively supplied by the operator of the machine 10. This is accomplished by mounting such rearward end by pistons 50, 52, respectively, disposed in cylinders 54, 56. The frame 16 is supported from below by skids 34, 36 engaging the walls 14 of the tunnel 12 and, as shown in FIG. 4, is also supported by oppositely extending rib jack assemblies 38, 40 tightly engaging opposing walls 14 of the tunnel 12. As illustrated, each rib jack assembly 38, 40 comprises a piston 42 slidably disposed in a cylinder 44 and carrying at its outer end a gripping shoe 46 adapted for engaging a wall 14. Hydraulic fluid is selectively supplied to the cylinders 44 to urge the pistons 42 outwardly and, hence, force the gripping shoes 46 into engagement with the walls 14. Thus, the frame 16 may be horizontally displaced towards one side or the other by merely varying the relative extension of the pistons 42; and the tunnel boring machine 10 may be thereby steered in the desired horizontal direction. The machine 10 is steered in the desired vertical direction by selectively supplying pressurized fluid to the cylinders 54, 56 to vertically move the rearward end of the pilot tube assembly 22. (During the steering of the machine 10, as will be understood, the pilot tube assembly 22 is anchored in the pilot bore 24 at 48 and effectively pivots about this anchor point 48.)

Figure 3:
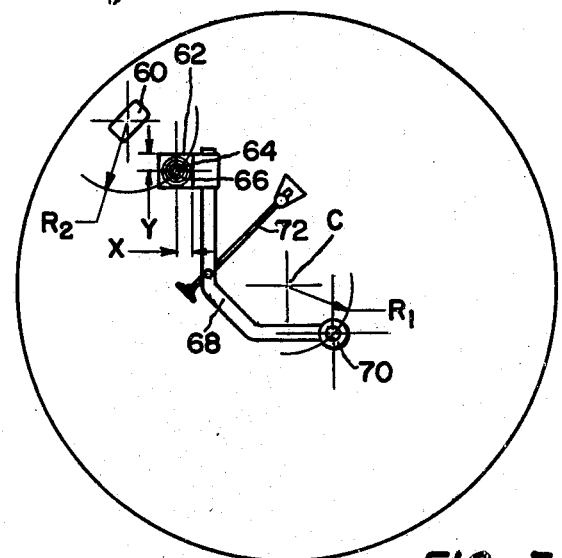
FIG. 3 is an elevational view showing the reflector and target of the guidance apparatus.

The illustrated embodiment of the guidance system essentially comprises a laser projection unit 58, a mirror-like reflector or reflecting means 60 fixedly carried by the machine 10, and a target 62 also carried by the machine 10. The laser projection unit 58 is fixedly mounted on a wall 14 of the tunnel 12 rearwardly of the reflector 60 and target 62, and is arranged to direct its laser beam forwardly and directly onto the reflector 60 whereby the latter provides a reflection of the laser beam. The target 62 is mounted rearwardly of the reflector 60 in spaced relationship thereto and is positioned out of the direct path of the laser beam emitted by the laser projection unit 58, but arranged to directly receive the reflection of the laser beam provided by the reflector 60. The target 62, as shown in FIG. 3, is provided with reference indicia suitable for comparison with the reflection provided thereon by the reflector 60, this reference indicia comprising a bull's-eye 64 surrounded by concentric circular markings 66, and X and Y axes.

The target 62 is fixedly mounted on one end of a bent tubular mounting arm 68 which at its opposing end is pivotally connected at 70 to the machine 10. The mounting arm 68 is adjustably locked against pivotal movement by an adjustment or leveling screw 72 whereby, during the operation of the machine 10, the reflector 60 and target 62 are normally retained in fixed relative positions. The pivotal connection 70 is arranged on the opposing side of the machine centerline C from the reflector 60 and target 62 and is at a radius $R_1$ from the centerline C equal to the radius $R_2$ of the reflection on the target 62 from the beam centerline. Thus, during roll of the machine 10, the reflection will be maintained on the bull's-eye 64 (assuming, of course, that the target 62 be maintained level by the leveling screw 72) provided that the machine 10 is not moving either horizontally or vertically from its desired predetermined path.

In the operation of the aforedescribed guidance system, the laser projection unit 58 is affixed in a position in which it directs its laser beam onto the reflector 60 along a path according to the predetermined path along which the machine 10 is to bore. Thereafter, providing that the machine 10 does not deviate from its desired path of movement, the reflector 60 will provide its reflection on the bull's-eye 64 of the target 62. When, however, the machine 10 deviates horizontally (or sidewise) from the desired path, the reflection on the target 62 will correspondingly move horizontally from the bull's-eye 64. The extent of this movement of the reflection relative to any given deviation of the machine 10 is determined by the ratio between the distance A between the anchor point 48 and the mirror 60 and the distance B between the anchor point 48 and the target 62. This ratio is, of course, variable between different machines; and the ratio which provides the greatest control stability should be employed in each application.

Upon observing the aforementioned displacement of the reflection from the target bull's-eye 64, the operator of the machine 10 steers the machine by selectively supplying hydraulic fluid to the cylinders 44 to vary the relative extension of the pistons 42 such that the machine is laterally or horizontally displaced in the direction required to again locate the reflection on the bull's-eye 64.

Similarly, the machine 10 is steered in a vertical direction to maintain the reflection on the bull's-eye 64. Thus, in order to properly direct the machine 10 along the desired predetermined path, the operator need only, with the target 62 maintained level, maintain the reflection on the bull's-eye 64 and, as necessitated by horizontal and vertical deviations of the machine 10, properly steer the machine to relocate the reflection on such bull's-eye.

From the preceding description it will be seen that the method of guiding a tunnel boring machine through the employment of the aforedescribed system may comprise directing a light beam along a path according to a predetermined path onto a reflector which provides a reflection of the light beam, observing the reflection on a target, and steering the machine in accordance with the location of the reflection on the target to maintain the reflection in proper location thereon.

We claim:
1. A guidance system for a tunnel boring machine, comprising reflecting means mounted on the machine, signal emitting means mounted on a fixed support and arranged to direct a beam of light into said reflecting means whereby said reflecting means provides a reflection of said light beam, target means, and mounting means mounting said target means on the machine spaced from said reflecting means, said target means being out of the direct path of said light beam and arranged to receive said reflection of said light beam from said reflecting means, and said mounting means being connected to the machine by a connection at a radius from the machine centerline equal to the radius of the reflection on said target means from the centerline of the light beam.

2. The guidance system according to claim 1, further comprising means for leveling said target means, said target means being rearwardly of said reflecting means, and said signal emitting means being a laser unit directing a laser beam on said reflecting means.

3. The guidance system according to claim 1, wherein said connection of said mounting means to said machine is a pivotal connection, and further comprising means for adjustably locking said mounting means against pivoting movement.

4. A guidance system for a tunnel boring machine comprising a mirror-like reflector mounted on the machine, a laser unit mounted on a fixed support and arranged to direct a laser beam onto said reflector whereby the latter provides a reflection of said laser beam, a target, and mounting means mounting said target on the machine spaced from and rearwardly of said reflector, said target being out of the direct path of said laser beam and arranged to receive said reflection of said laser beam from said reflector, said mounting means being pivotally connected to the machine by a pivotal connection on the opposing side of the machine centerline from said reflector and target, and said pivotal connection being at a radius from the machine centerline equal to the radius of the reflection on said target from the centerline of the laser beam.

5. The guidance system according to claim 4, further comprising means for adjustably locking said mounting means against pivotal movement.

6. The guidance system according to claim 4, further comprising said mounting means including a bent mounting arm extending around the centerline of the machine.

7. A guidance system for a tunnel boring machine which includes a main cutter for boring a tunnel and which is provided with means for angularly displacing said main cutter about a point on the machine, said guidance system comprising reflecting means mounted on the machine rearwardly of such point about which said main cutter is displaced, signal emitting means mounted on a fixed support rearwardly of said reflecting means and arranged to direct a beam of light onto said reflecting means whereby the latter provides a reflection of said light beam, and nonreflecting target means carried by said machine spaced from said reflecting means, said target means being out of the direct path of said light beam and arranged to receive said reflection of said light beam from said reflecting means.

8. A guidance system for a tunnel boring machine which includes a main cutter for boring a tunnel and a pilot assembly extending forwardly of said main cutter, such tunnel boring machine being provide with means for angularly displacing said main cutter about a point on said pilot assembly, said guidance system comprising reflecting means mounted on the machine rearwardly of such point about which said main cutter is displaced, laser projection means mounted on a fixed support rearwardly of said reflecting means and arranged to direct a laser beam onto said reflecting means whereby the latter provides a reflection of said laser beam, and nonreflecting target means carried by said machine rearwardly of and spaced from said reflecting means, said target means being out of the direct path of said laser beam and arranged to receive said reflection of said laser beam from said reflecting means.

9. A guidance system according to claim 8, wherein said reflecting means is fixedly mounted on the machine and said target means is movably mounted on the machine.

References Cited

UNITED STATES PATENTS

| | | | |
|---|---|---|---|
| 1,768,191 | 6/1930 | Crook | 350—100 |
| 2,667,805 | 2/1954 | Carr. | |
| 3,321,248 | 5/1967 | Williamson et al. | 299—1 |

ERNEST R. PURSER, Primary Examiner

U.S. Cl. X.R.

33—46